United States Patent [19]
Anderson

[11] Patent Number: 5,519,435
[45] Date of Patent: May 21, 1996

[54] MULTI-USER, ON-DEMAND VIDEO STORAGE AND RETRIEVAL SYSTEM INCLUDING VIDEO SIGNATURE COMPUTATION FOR PREVENTING EXCESSIVE INSTANTANEOUS SERVER DATA RATE

[75] Inventor: Michael H. Anderson, Moorpark, Calif.

[73] Assignee: Micropolis Corporation, Chatsworth, Calif.

[21] Appl. No.: 299,829

[22] Filed: Sep. 1, 1994

[51] Int. Cl.$^6$ .......................... G06F 13/372; H04N 7/173
[52] U.S. Cl. ...................... 348/8; 348/6; 348/7; 395/550; 455/4.1; 455/4.2
[58] Field of Search ...................... 348/7, 8, 6; 395/550; 455/4.1, 4.2

[56] References Cited

U.S. PATENT DOCUMENTS

| | | | |
|---|---|---|---|
| 4,506,387 | 3/1985 | Walter | 359/118 |
| 4,870,643 | 9/1989 | Bultman et al. | 395/182.05 |
| 4,947,244 | 8/1990 | Fenwick et al. | 348/8 |
| 4,949,170 | 8/1990 | Yanagidaira et al. | 348/7 |
| 4,949,187 | 8/1990 | Cohen | 358/335 |
| 4,985,784 | 1/1991 | Tsuboi et al. | 358/342 |
| 4,995,078 | 2/1991 | Monslow et al. | 380/10 |
| 5,014,125 | 5/1991 | Pocock et al. | 348/7 |
| 5,060,068 | 10/1991 | Lindstrom | 348/722 |
| 5,119,188 | 6/1992 | McCalley et al. | 348/6 |
| 5,132,992 | 7/1992 | Yurt et al. | 375/240 |
| 5,133,079 | 7/1992 | Ballantyne et al. | 455/4.1 |
| 5,172,228 | 12/1992 | Israelsen | 348/422 |
| 5,191,584 | 3/1993 | Anderson | 371/51.1 |
| 5,247,347 | 9/1993 | Litteral et al. | 348/7 |
| 5,253,275 | 10/1993 | Yurt et al. | 375/240 |

*Primary Examiner*—Ken S. Kim
*Attorney, Agent, or Firm*—Poms, Smith, Lande & Rose

[57] ABSTRACT

A plurality of movies are distributively stored in digitally encoded form on a mass storage unit such as a Redundant Array of Inexpensive Drives (RAID) disk drive array such that they can be viewed on demand by multiple users. A video server receives movie requests from users, and retrieves and transmits the requested movie data from the RAID array to processors at the respective user locations. The processors decode the retrieved data to produce video picture and audio information and display the corresponding movies on monitors. Temporal instantaneous digital data rate signatures for the movies are computed and stored, and a current composite signature is computed by summing the signatures for all movies currently being shown. When an additional movie is requested, the signature for the additional movie is combined with the current composite signature to produce a new composite signature. If any part of the new composite signature exceeds the maximum data rate capability of the server, the signature for the movie is shifted forward in time by a predetermined increment, and again combined with the current composite signature to produce a recalculated new composite signature. This is repeated as required until a new composite signature is obtained with no part thereof exceeding the maximum data rate capability of the server, and retrieval and showing of the additional movie is initiated at time corresponding to the total time shift.

21 Claims, 2 Drawing Sheets

MULTI-USER, ON-DEMAND VIDEO STORAGE AND RETRIEVAL SYSTEM INCLUDING VIDEO SIGNATURE COMPUTATION FOR PREVENTING EXCESSIVE INSTANTANEOUS SERVER DATA RATE

BACKGROUND OF THE INVENTION

1. Field of the Invention

The present invention generally relates to the art of multi-user, on-demand video entertainment systems, and more specifically to a video data storage and retrieval system including a video signature computation arrangement for preventing an excessive instantaneous server data rate.

2. Description of the Related Art

User-on-demand, also known as pay-per-view, video entertainment systems are becoming increasingly popular in motel and hotel facilities as well as in larger scale community cable television (CATV) systems.

Such a system includes a video server located at a central location that stores a plurality of movies that can be selected for viewing by one or more users at any desired time. The video server is connected to television receivers or monitors at the individual user locations by a cable or other network.

Each user is provided with means for requesting that a selected movie be retrieved from the server and shown on his or her television receiver in an on-demand, pay-per-view basis. In a small scale system such as installed in a motel or hotel, an interactive remote control unit can be provided for each television receiver by which the user can request a movie using a menu system displayed on the television screen. In a large scale system such as a community cable television network, the user can call the cable company by telephone to request that the movie transmitted to his home receiver.

A known video server system comprises a mass storage unit in the form of a Redundant Array of Inexpensive Drives (RAID) disk drive array. Data access to and from the individual drives of the RAID array is controlled by a master controller. A plurality of movies are stored on the array in a distributed or "striped" manner such that any movie can be viewed by more than one user, or even by all users simultaneously starting at different times. The RAID arrangement is further advantageous in that it balances the usage load over the disk drives.

The basic RAID configuration, including a description of distributed storage of data, is disclosed in U.S. Pat. No. 4,870,643, entitled "PARALLEL DRIVE ARRAY STORAGE SYSTEM", issued Sep. 26, 1989 to David Bultman et al, and an improved arrangement is disclosed in my prior U.S. Pat. No. 5,191,584, entitled "MASS STORAGE ARRAY WITH EFFICIENT PARITY CALCULATION", issued Mar. 2, 1993. Both of these patents are assigned to the Micropolis Corporation of Chatsworth, Calif., the assignee of the present invention.

The video and audio movie data and control functions are processed by a server, which is typically a conventional personal computer (PC). Movie requests from the remote control units (or by telephone) are sent to the PC server.

In response to a movie request, the server sends a command to the RAID array to retrieve the data corresponding to the requested movie from the disk drives. The data is read out of the array and fed back through the server to a decoder array which converts the data into an audio/visual channel and feeds it to the requesting user. In order to enable more than one user to view a movie simultaneously, data is retrieved from the array in small time multiplexed blocks.

An average data rate of approximately 375 kilobytes/second per user is required to provide substantially real-time viewing. A video server as embodied by a PC class computer is capable of handling a maximum composite data rate (multiplexed data for all users) of approximately 15 megabytes/sec. For a system including 30 users, this translates into an average server composite data rate of 11.25 megabytes/sec, which is within the maximum capability of the server.

However, depending upon the instantaneous picture content and thereby the degree of compression of the data, the data rate can exceed 2 megabytes/sec per user for short periods of time. Generally, less data per unit time is required to represent still or slowly changing images, whereas large data rates correspond to rapidly changing images.

In the worst case scenario in which the data rates for all 30 users are instantaneously 2 megabytes/sec, the composite data rate is 60 megabytes/sec, which is far in excess of the maximum capability of the server.

The obvious approach to solving this problem is to provide a buffer memory to temporarily store the excess data until it can be processed by the server. For example, in a 30 user system that is required to sustain a 2 megabyte/second per user data rate for 10 seconds, the capacity of a buffer memory that would be capable of handling this overflow would be equal to (60−15) megabytes/sec×10 seconds=450 megabytes.

A buffer having a capacity of 450 megabytes is disproportionately large and prohibitively expensive for a small commercial application such as a video entertainment system for a motel. The problem of accommodating excessive instantaneous composite data rates in a commercially practical PC server system has therefore remained unsolved.

SUMMARY OF THE INVENTION

It is an object of the present invention to provide a multi-user, on-demand video server system in which the problem of accommodating excessive instantaneous composite data rates is solved in a commercially practical manner. This is accomplished without the necessity of a large and expensive buffer memory.

In accordance with the present invention, a plurality of movies are distributively stored in digitally encoded form on a mass storage unit such as a Redundant Array of Inexpensive Drives (RAID) disk drive array such that they can be viewed on demand by multiple users. The movies are preferably encoded in Motion Picture Experts Group (MPEG) format.

A video server receives movie requests from users, and retrieves and transmits the requested movie data from the RAID array to processors at the respective user locations. The processors decode the retrieved data to produce video picture and audio information and display the corresponding movies on monitors.

Temporal instantaneous digital data rate signatures for the movies are computed and stored, and a current composite signature is computed by summing the signatures for all movies currently being shown. When an additional movie is requested, the signature for the additional movie is combined with the current composite signature to produce a new composite signature.

If any part of the new composite signature exceeds the maximum data rate capability of the server, the signature for the movie is shifted forward in time by a predetermined increment, and again combined with the current composite signature to produce a recalculated new composite signature.

This is repeated as required until a new composite signature is obtained with no part thereof exceeding the maximum data rate capability of the server, and retrieval and showing of the additional movie is initiated at time corresponding to the total time shift.

The above and other objects, features and advantages of the present invention will become apparent to those skilled in the art from the following detailed description taken with the accompanying drawings, in which like reference numerals refer to like parts.

DETAILED DESCRIPTION OF THE INVENTION

Figure 1:
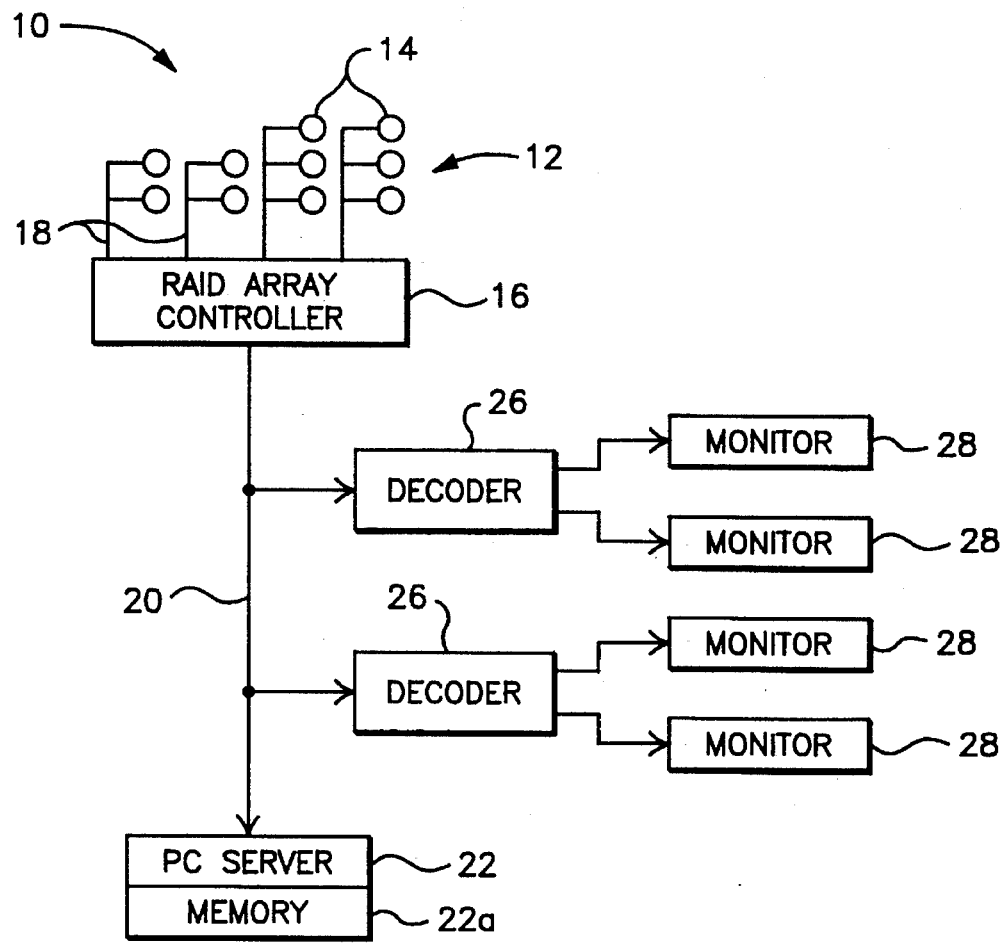
FIG. 1 is a block diagram of a data storage and retrieval system for a multi-user, on-demand video/audio server according to the present invention.

A data storage and retrieval system 10 for a multi-user, on-demand video/audio server according to the present invention is illustrated in FIG. 1. The system 10 comprises a mass storage which is preferably constituted by a Redundant Array of Inexpensive Drives (RAID) array 12 including, for example, ten individual disk drives 14 that are controlled synchronously by a master RAID controller 16.

Each disk drive 14, although not explicitly illustrated, includes a Small Computer System Interface (SCSI) input-output (I/O) interface for connection of the respective disk drive 14 to the controller 16 via four wide (16 bit) SCSI data buses 18 that each support a data rate of approximately 10 megabytes/second.

The controller 16 is connected by a 20 megabyte/sec SCSI bus 20 to a PC server 22 that is typically constituted by a personal computer (PC). The server 22 is provided with a memory 22a that can be used to handle small data overflows.

The system 10 further comprises a plurality of processors in the form of decoders 26 that are provided at the user locations and are connected to the controller 16 and the server 22 by the SCSI bus 20. Each decoder 26 has at least one output that is connected television receiver or monitor 28 for an individual user. The monitors 28 can be provided in individual rooms of a motel or hotel facility, or in the homes of individual customers. A typical system for a small motel will include four decoders 26 having outputs that are distributively connected to thirty monitors 28.

A plurality of movies are distributively stored on the RAID array 12 such that any movie can be retrieved and viewed by any user at any time. This is made possible by the manner in which the movie data is stored on the array 12.

More specifically, data elements or bytes of movie video and audio data are stored across the drives 14 of the array 12 in a "striped" arrangement. Each stripe comprises a plurality of successive data bytes that are stored in the same numerical location in the drives 14 respectively. One of the drives 14 is preferably used to store a parity byte for each stripe such that the data for a drive that has malfunctioned or is temporarily removed from service can be reconstructed to provide interrupted operation. The distributed data storage arrangement using a RAID array is described in more detail in the above referenced U.S. patents.

Each user is typically provided with an interactive remote control unit (not shown) for requesting a movie from a menu displayed on the user's monitor 28. The remote control units cause signals or commands designating requested movies to be sent to the PC server 22.

The PC server 22 stores information designating the specific locations in the array 12 in which each movie is stored. In response to a movie request, the PC server 22 generates a list of all of the locations for the requested movie, and sends SCSI commands to the controller 16 through the SCSI bus 20 that designates the locations in the array 12 from which the movie data is to be retrieved.

More specifically, the server 22 sends successive commands to the controller 16 designating the locations of successive blocks of data for the requested movie in the array 12. Typically, each command will contain the locations of data corresponding to 0.5 seconds of viewing time for the movie. Assuming a data rate of 375 kilobytes/second, a 0.5 second block of data will correspond to 187.5 kilobytes of data stored in the array 12.

In response to a command from the server 22, the controller 16 sends a SCSI read command through the buses 18 that causes the data at the designated locations in the array 12 to be read out or retrieved and transmitted through the SCSI bus 20 to the corresponding decoder 26.

Each decoder 26 decodes or decompresses the MPEG encoded digital data to produce analog picture and sound data and applies it to the monitor 28 of the requesting user. In this manner, 0.5 seconds of data for the requested movie is retrieved from the RAID array 12 and shown on the requesting user's monitor 28.

An average data rate of approximately 375 kilobytes/second per user is required to provide substantially real-time viewing. The video server 22 as embodied by a PC class computer is capable of handling a maximum composite data rate (multiplexed data for all users) of approximately 15 megabytes/sec. For a system including 30 users, this translates into an average server throughput data rate of 11.25 megabytes/sec, which is within the maximum capability of the server 22.

Figure 2:
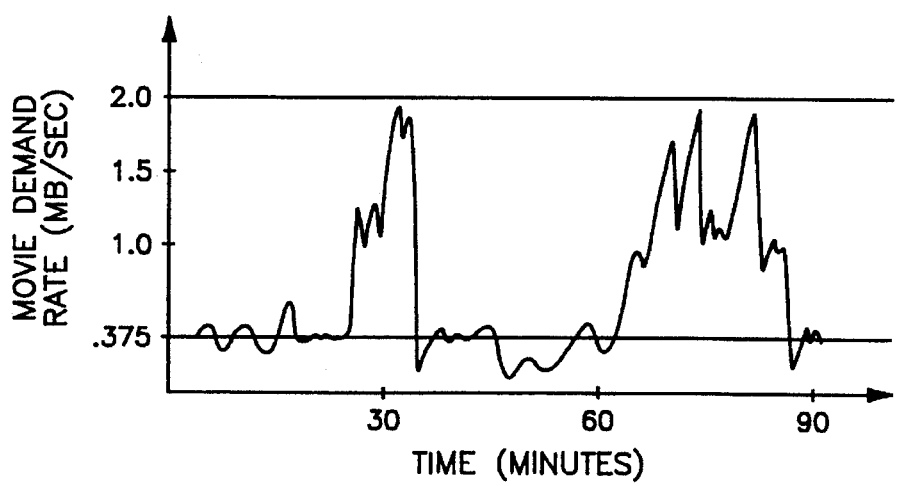
FIG. 2 is a graph illustrating the instantaneous digital data rate as a function of time for one user viewing a single movie that is retrieved using the system of FIG. 1.

However, as illustrated in FIG. 2, depending upon the instantaneous picture content and thereby the degree of compression of the data, the data rate can exceed 2 megabytes/sec per user for short periods of time. Generally, less data per unit time is required to represent still or slowly changing images, whereas large data rates correspond to rapidly changing images.

In the worst case scenario in which the data rates for all 30 users are instantaneously 2 megabytes/sec, the required data throughput rate for the server 22 is 60 megabytes/sec, which is far in excess of the maximum capability of the server 22.

Figure 3:
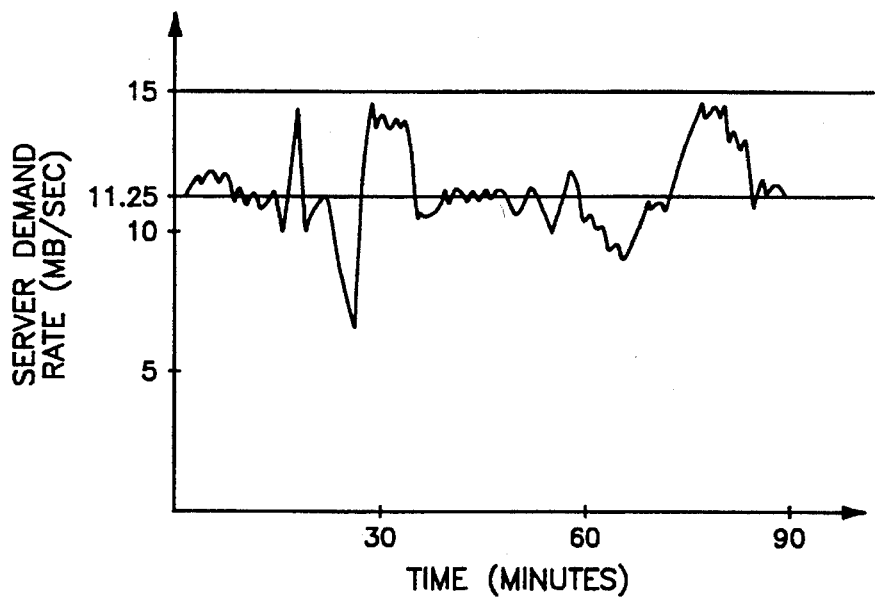
FIG. 3 is a graph illustrating the instantaneous composite digital data rate for all users of the system viewing movies simultaneously as limited to within the capability of a PC server of the system in accordance with the present invention.

This problem is solved in accordance with the present invention such that the composite instantaneous digital data rate for all of the users is limited to below 15 megabytes/sec as illustrated in FIG. 3. This is accomplished without the provision of a large and expensive buffer memory.

In accordance with the present method, a temporal instantaneous digital data rate signature is calculated for each of the data files representing the movies stored in the RAID array 12. The signature for a data file is obtained dividing the file into time increments, and determining the number of bits of picture data in each increment. For example, a typical 90 minute movie can be divided into two second increments, and the total number of data bits for each increment can be calculated.

In this manner, one number of bits is provided for each time increment such that the signature for a 90 minute movie will consist of 90 min×60 sec/min÷2 sec=2,700 numbers. If a user is viewing a movie at the average instantaneous data rate of 375 kilobytes/sec and each byte consists of 8 bits, the bit rate/sec is 375 kilobytes/sec×16 bits/byte=3 megabits/sec. The number of bits in the corresponding two second time increment will be 375 kilobytes/sec×2 sec×8 bits/byte=6 megabits.

As another example, if a 0.5 second increment is selected, the signature for a 90 minute movie will consist of 90 min×60 sec/min÷0.5 sec=10,800 numbers, and the number of bits for a data rate of 375 kilobytes/sec will be 375 kilobytes/sec×0.5 sec×8 bits/byte=1.5 megabits.

The signature can be obtained by playing the movie and electronically counting the numbers of bits in each time increment. However, the numbers of bits for each time increment can be more advantageously calculated from data that is available in the MPEG video bitstream.

More specifically, each movie consists of individual frames or pictures that are displayed at a rate of, for example 30 pictures per second. At this rate, the pictures are merged together by the human eye and provide the illusion of continuous movement. The information in the MPEG video bitstream enables calculation of the number of bits that represent each picture.

In an MPEG bitstream, each video sequence consists of a sequence heater, a number of groups of pictures, and a sequence-end code.

Each group of pictures (identifiable by a group-of-pictures code) contains one or more intracoded pictures (I-frame). The first coded picture in a group of pictures is always an I-frame. The MPEG bitstream also includes predicted pictures (P-frames) and bidirectional pictures (B-frames) between consecutive I-frames.

Each picture in a group of pictures has assigned a temporal reference (picture number in a group of pictures), and the type of picture can be identified by a picture-coding-type field. A group of pictures may be of any length, but it always contains one or more I-frames.

The distance between I-frames is usually a fixed interval (e.g. every 8 or 15 pictures), established during the encoding process. Since pictures are displayed at a fixed rate, e.g. 30 pictures/second, the distance between two I-frames is fixed in time (e.g. every 15 frames or 0.5 seconds in time).

Although the present invention is not so limited, the data signature is preferably derived by counting the number of bytes between the picture-coding-type fields for consecutive I-frames. For example, at the average data rate of 375 kilobytes/second, there will be 375 kilobytes/second×0.5 seconds=187.5 kilobytes of data between two consecutive I-frames. The signature number for a corresponding 0.5 second time increment is 187.5 kilobytes×8 bits/byte=1.5 megabits.

For the last few pictures of the movie following the last I-frame, the number for the corresponding last time increment is calculated from the end of the last I-frame to the end of the last sequence.

In this manner, a signature is calculated for each movie and stored in the memory 22a of the server 22. The signatures are utilized by the present system 10 to adjust the playing times of the movies to prevent the instantaneous data rate of the server 22 to exceed its capability, in the present example 15 megabytes/sec.

More specifically, a composite signature is obtained by summing the individual signatures for each movie that is currently being retrieved and transmitted to the decoders 26. For each time increment, the composite signature will consist of the sum of the numbers of bits for the individual movies in the respective increment.

When an additional movie is requested by a user, the server 22 adds the signature for the additional movie to the current composite signature to obtain a new composite signature. The server 22 then compares the number of bits for each time increment of the new composite signature with a predetermined maximum data rate criteria, in this case an instantaneous maximum data rate of 15 megabytes/sec.

If none of the numbers in the new composite signature exceed the criteria (the criteria is satisfied), the server 22 immediately initiates retrieval of the requested movie from the RAID array 12 for transmission to the requesting user.

If, however, any of the numbers in the new composite signature exceed the criteria (the criteria is not satisfied), the server 22 shifts the signature for the additional movie forward in time by a predetermined time increment of, for example 2 seconds, and recalculates the new composite signature as the sum of the current composite signature and the shifted additional movie signature. The server 22 also sends a message to the requesting user that the movie will be delayed for a brief period of time.

The newly calculated composite signature is again compared with the maximum data rate criteria. If the criteria is satisfied, the server 22 immediately initiates retrieval of the requested movie from the RAID array 12 for transmission to the requesting user.

If, however, the criteria is not satisfied, the server 22 shifts the signature for the additional movie forward in time by an additional time increment, and again recalculates the new composite signature as the sum of the current composite signature and the shifted additional movie signature.

This operation is repeated until a new composite signature is obtained which satisfies the maximum data rate criteria. The server 22 initiates retrieval of the requested movie from the RAID array 12 for transmission to the requesting user at a time corresponding to the total shift of the signature for the additional movie.

In this manner, playing of a requested movie is optimally delayed until it has been determined that the instantaneous maximum data rate of the server 22 will not exceeded. This is accomplished in accordance with the present invention without a buffer memory. It will be noted, however, that the memory 22a can be used to accommodate small data overflows if desired to enhance the operation of the system 10.

Figure 4:
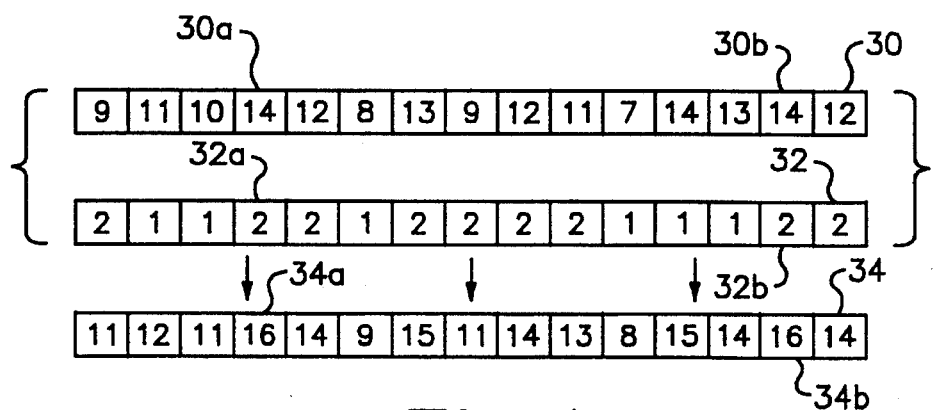
FIG. 4 is a diagram illustrating an initial video data rate signature calculation that is performed in response to a request for an additional movie by a user that results in a computed composite data rate that is beyond the capability of the server.
Figure 5:
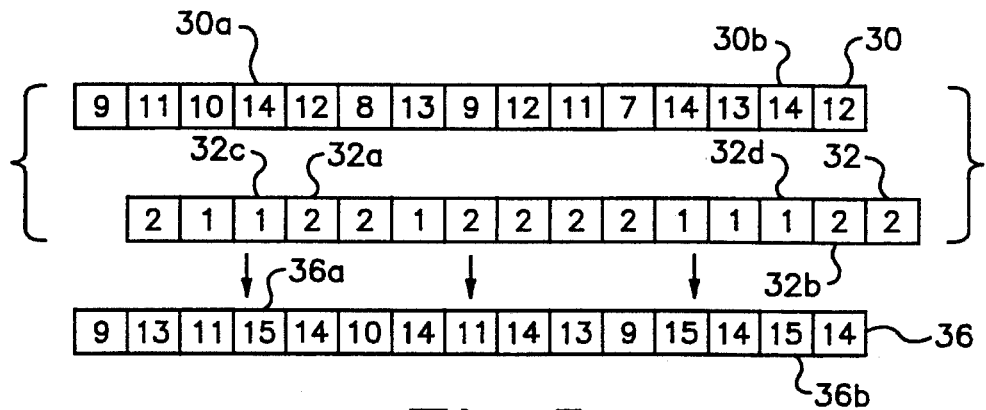
FIG. 5 is similar to FIG. 4, but illustrates a re-calculation that results in limitation of the composite data rate to within the capability of the server.

Calculation and re-calculation of the new composite signature is illustrated in the form of a greatly simplified example in FIGS. 4 and 5. In FIG. 4, a current composite signature 30 comprises numbers of megabytes (one byte=16 bits) for fifteen time increments of one second each. The numbers range from a low of 7 megabytes to a high of 14 megabytes. The entire composite signature 30 satisfies the maximum data rate criteria since none of the numbers exceed 15 megabytes.

The signature for an additional requested movie is designated as 32, and comprises numbers of megabytes consisting of one or two. A new composite signature 34 is obtained by summing the numbers for the corresponding time increments of the signatures 30 and 32.

Most of the numbers in the new composite signature 34 are less than 15. However, the number for a time increment 34a in the signature 34 having a value of "16" is obtained by summing corresponding numbers in increments 30a and 32a having values of "14" and "2" in the signatures 30 and 32 respectively. Similarly, a number for an increment 34b in the signature 34 having a value of "16" is obtained by summing corresponding numbers in increments 30b and 32b having values of "14" and "2" in the signatures 30 and 32 respectively.

The new composite signature 34 does not satisfy the maximum data rate criteria because it comprises two numbers "16" that are higher than the criteria value of "15".

This situation is alleviated by shifting the signature 32 forward in time by one second (rightwardly as viewed in the drawing) as illustrated in FIG. 5, and re-calculating the new composite signature as indicated at 36 by summing the current composite signature 30 with the shifted signature 32.

A time increment 32c in the shifted signature 32 having a numerical value of "1" is now aligned with the increment 30a of the signature 30 such that their sum in the signature has a value of "15". Similarly, a time increment 32d in the signature 32 having a numerical value of "1" is aligned with the increment 30b of the signature 30 such that their sum in the signature has a value of "15".

None of the numbers in the signature 36 exceed the maximum data rate criteria of "15". In this manner, initiation of playing the movie having the signature 32 is delayed by one time increment (in the illustrated simplified example one second), and the data rate capability of the server 22 is not exceeded at any time during the retrieval of all of the movies.

In summary, the present invention provides a data storage and retrieval system for a multi-user, on-demand video server system in which the problem of accommodating excessive instantaneous composite data rates is solved in a commercially practical manner. This is accomplished without the necessity of a large and expensive buffer memory.

Various modifications will become possible for those skilled in the art after receiving the teachings of the present disclosure without departing from the scope thereof. For example, although the present invention has been described and illustrated as being applied to the storage and retrieval of video and audio data for a multi-user, on-demand video entertainment system, the invention is not so limited, and can be advantageously applied to the storage and retrieval of other types of data files in, for example, a multi-user computer network having a central file server facility or a CD ROM based digital information storage and retrieval system.

I claim:

1. A data storage and retrieval system, comprising:

a storage for storing a plurality of digital data files;

a plurality of processors for concurrently processing data files transmitted thereto from the storage;

a server for concurrently retrieving selected data files from the storage and transmitting said selected data files to selected processors respectively;

a memory for storing one temporal instantaneous digital data rate signature for each of said data files respectively; and a computer that is programmed to perform the steps of:
    (a) computing a current composite signature by summing said signatures for said selected data files respectively;
    (b) when an additional data file is selected for retrieval and transmittal, computing a new composite signature by summing a new signature constituted by said signature for said additional data file with said current composite signature;
    (c) comparing said new composite signature with a predetermined maximum data rate criteria;
    (d) if said new composite signature satisfies said criteria, controlling the server to retrieve and transmit said additional data file; and
    (e) if said new composite signature does not satisfy said criteria, computing a shifted signature by temporally shifting said new signature forward by a predetermined time increment, recomputing said new composite signature by summing said shifted signature with said current composite signature and jumping to step (c).

2. A system as in claim 1, in which the storage stores each of said data files as comprising a plurality of digitally encoded pictures.

3. A system as in claim 2, in which:

said pictures are encoded as comprising numbers of picture bits that vary in accordance with video contents of said pictures; and the memory stores said signatures as comprising a predetermined function of said numbers of picture bits for said pictures respectively.

4. A system as in claim 3, in which the memory stores said signatures such that said predetermined function comprises numbers of picture bits for predetermined time increments respectively.

5. A system as in claim 4, in which said criteria comprises a predetermined maximum value of said numbers of picture bits for said predetermined time increments respectively.

6. A system as in claim 5, in which:

said criteria is satisfied if none of said numbers of picture bits for said predetermined time increments exceeds said maximum value; and said criteria is not satisfied if any of said numbers of picture bits for said predetermined time increments exceeds said maximum value.

7. A system as in claim 6, in which said maximum value corresponds to a maximum data throughput rate of the server.

8. A system as in claim 1, in which said criteria comprises a maximum data throughput rate of the server.

9. A system as in claim 1, in which:

the storage stores said data files as movies comprising pluralities of digitally encoded pictures respectively; and each processor comprises a decoder for decoding said movies and a monitor for displaying said decoded movies.

10. A system as in claim 9, in which the storage comprises a Redundant Array of Inexpensive Drives (RAID) disk drive array that distributively stores said movies.

11. A data storage and retrieval method, comprising the steps of:
- (a) storing a plurality of digital data files in a storage;
- (b) concurrently retrieving selected data files from the storage and transmitting said selected data files to selected processors respectively;
- (c) storing one temporal instantaneous digital data rate signature for each of said data files respectively;
- (d) computing a current composite signature by summing said signatures for said selected data files respectively;
- (e) when an additional data file is selected for retrieval and transmittal, computing a new composite signature by summing a new signature constituted by said signature for said additional data file with said current composite signature;
- (f) comparing said new composite signature with a predetermined maximum data rate criteria;
- (g) if said new composite signature satisfies said criteria, controlling the server to retrieve and transmit said additional data file; and
- (h) if said new composite signature does not satisfy said criteria, computing a shifted signature by temporally shifting said new signature forward by a predetermined time increment, recomputing said new composite signature by summing said shifted signature with said current composite signature and jumping to step (f).

12. A method as in claim 11, in which step (a) comprises storing each of said data files as comprising a plurality of digitally encoded pictures.

13. A method as in claim 12, in which:
- said pictures are encoded as comprising numbers of picture bits that vary in accordance with video contents of said pictures respectively; and
- step (c) comprises storing said signatures as comprising a predetermined function of said numbers of picture bits for said pictures respectively.

14. A method as in claim 13, in which step (c) comprises storing said signatures such that said predetermined function comprises numbers of picture bits for predetermined time increments respectively.

15. A method as in claim 14, in which said criteria comprises a predetermined maximum value of said numbers of picture bits for said predetermined time increments respectively.

16. A method as in claim 15, in which:
- step (g) comprises determining that said criteria is satisfied if none of said numbers of picture bits for said predetermined time increments exceeds said maximum value; and
- step (h) comprises determining that said criteria is not satisfied if any of said numbers of picture bits for said predetermined time increments exceeds said maximum value.

17. A method as in claim 16, in which said maximum value in steps (g) and (h) corresponds to a predetermined maximum data throughput rate.

18. A method as in claim 11, in which said criteria in steps (g) and (h) comprises a predetermined maximum data throughput rate.

19. A method as in claim 11, in which:
- step (a) comprises storing said data files as movies comprising pluralities of digitally encoded pictures respectively; and
- step (b) further comprises decoding and displaying said movies.

20. A method as in claim 19, in which step (a) comprises distributively storing said movies on said storage as comprising a Redundant Array of Inexpensive Drives (RAID) disk drive array.

21. A multi-user, on-demand video server system, comprising:
- a Redundant Array of Inexpensive Drives (RAID) disk drive array for distributively storing a plurality of digitally encoded movies;
- a plurality of decoders for concurrently decoding movies transmitted thereto from the array for display on video monitors respectively;
- a PC server for concurrently retrieving selected movies from the array and transmitting said selected movies to selected decoders respectively;
- a memory for storing one temporal instantaneous digital data rate signature for each of said movies respectively; and
- a computer that is programmed to perform the steps of:
  - (a) computing a current composite signature by summing said signatures for said selected movies respectively;
  - (b) when an additional movie is selected for retrieval and transmittal, computing a new composite signature by summing a new signature constituted by said signature for said additional movie with said current composite signature;
  - (c) comparing said new composite signature with a predetermined maximum data rate criteria;
  - (d) if said new composite signature satisfies said criteria, controlling the PC server to retrieve and transmit said additional data file; and
  - (e) if said new composite signature does not satisfy said criteria, computing a shifted signature by temporally shifting said new signature forward by a predetermined time increment, recomputing said new composite signature by summing said shifted signature with said current composite signature and jumping to step (c).

* * * * *